June 25, 1957  C. J. IMERSHEIN  2,796,993
FILTER PLATES
Filed July 31, 1953 2 Sheets-Sheet 1
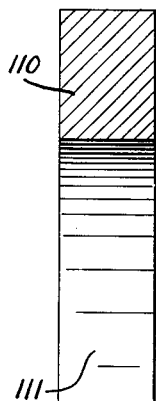
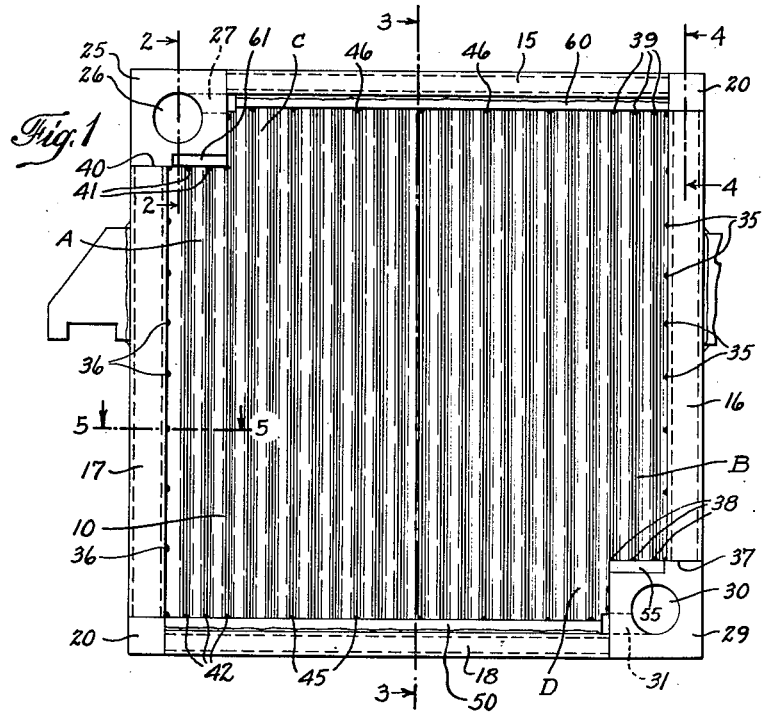
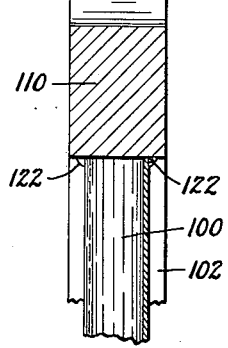
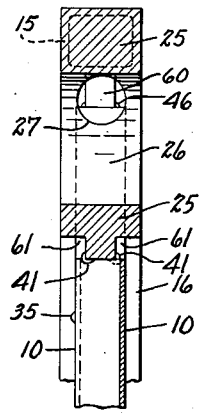
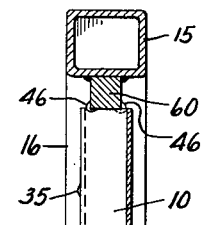
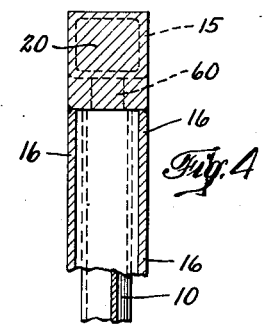
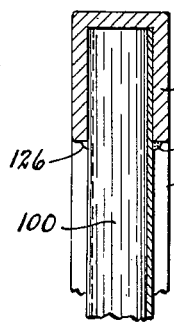
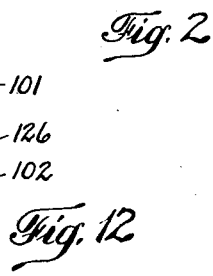
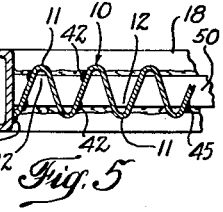
INVENTOR.
CHARLES J. IMERSHEIN
BY
Morgan, Finnegan, Durham & Pine
ATTORNEYS.

June 25, 1957  C. J. IMERSHEIN  2,796,993
FILTER PLATES
Filed July 31, 1953  2 Sheets-Sheet 2
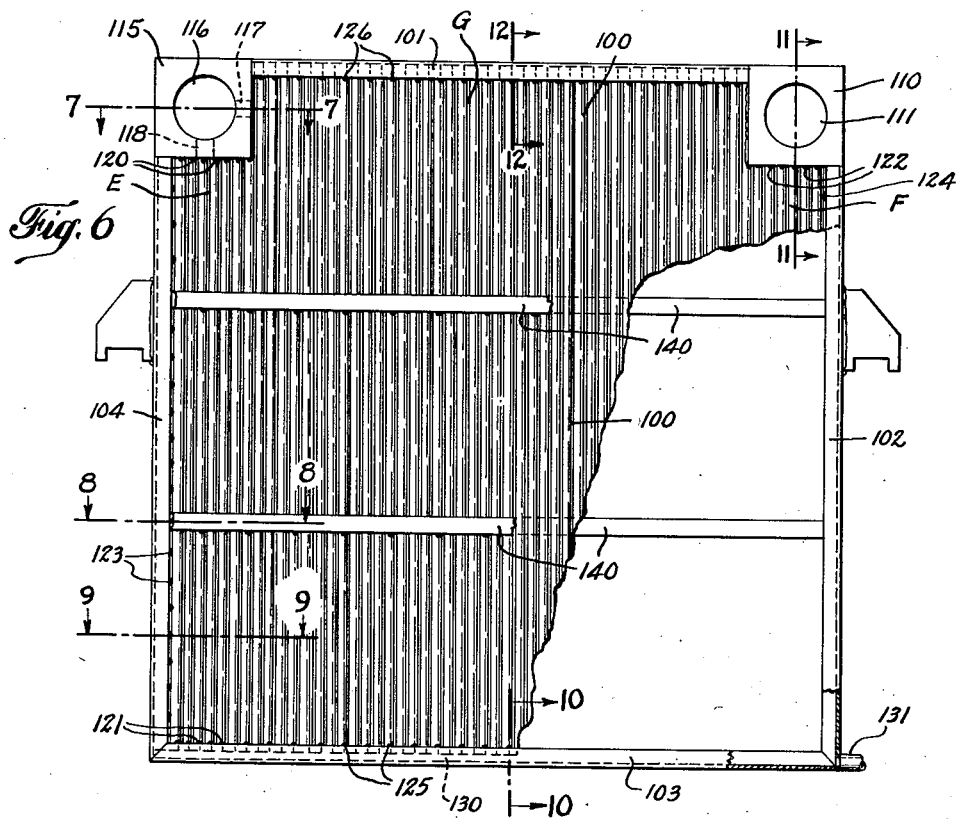
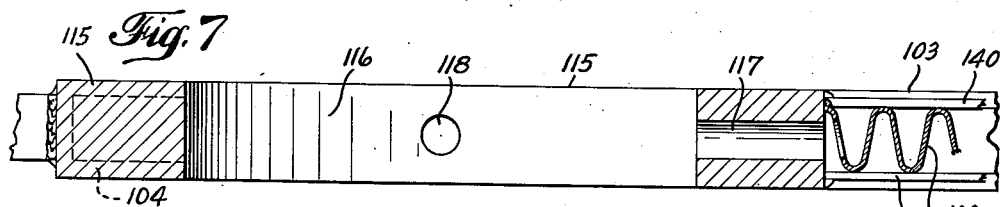
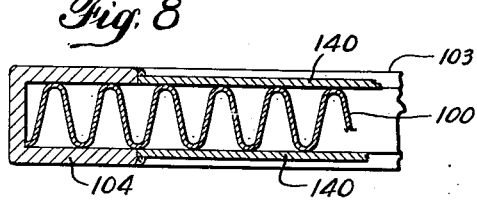
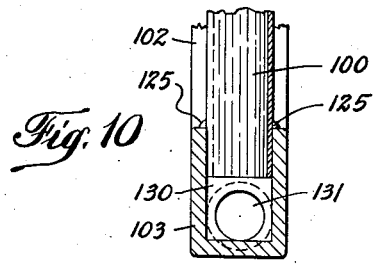
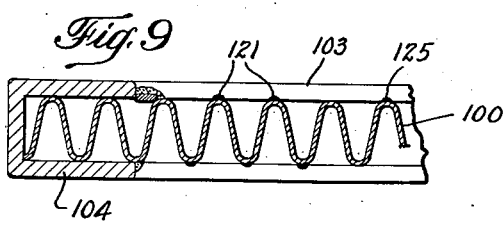
INVENTOR.
CHARLE J. IMERSHEIN
BY
Morgan, Finnegan, Durham & Pine
ATTORNEYS.

United States Patent Office 2,796,993
Patented June 25, 1957

2,796,993
FILTER PLATES

Charles J. Imershein, Cedarhurst, N. Y., assignor to Multi-Metal Wire Cloth Co., Inc., New York, N. Y., a corporation of New York Application July 31, 1953, Serial No. 371,543

4 Claims. (Cl. 210—487)

The invention relates to improvements in filter plates for plate and frame filter presses.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a front elevation of a filter press plate embodying the invention;

Figs. 2, 3, 4 and 5 are enlarged fragmentary sectional views taken on lines 2—2, 3—3, 4—4 and 5—5, respectively, of Fig. 1;

Fig. 6 is a front elevation, with parts broken away, and parts in section, of a modified form of a filter press plate embodying the invention, said plate being of a larger size than that shown in Fig. 1;

Figs. 7, 8, 9, 10, 11 and 12 are enlarged fragmentary sectional views taken on lines 7—7, 8—8, 9—9, 10—10, 11—11 and 12—12, respectively, of Fig. 6.

An object of the invention is to provide a new and improved filter press plate, preferably made of metal, which is of substantially lesser weight than plates conventionally made in whole or in part of metal castings but possessing equivalent or greater strength and resistance to the stresses of use. Another object is to provide such a plate fabricated from readily available sheet and bar stock in contrast to plates made in whole or in part of metal castings. Another object is to utilize corrugated metal sheeting for the filtration field of such a plate, thereby to employ the light weight and smooth surfaces of such material, while providing adequate strength and rigidity for use.

In conventional filter plates the entire article is usually a very heavy and rigid casting of iron or the like, requiring great strength and effort on the part of the workmen to install and remove. Such castings also are of great thickness in order to provide requisite strength and thus take up a large amount of space fore and aft of the press per unit area of filtration. By means of the invention relatively very light plates may be fabricated from light, rigid bar and sheet stock and the above-described advantages of a corrugated sheet may be attained without loss of strength or rigidity, while the plate is comparatively thin and thus a greater number of filtering units can be accommodated in a press of given length.

Another object of the invention is to provide a filter plate in which a greater area of filtration is available within a press of given cross-section, compared with conventional plate constructions, all without loss of strength or rigidity.

Still another object is the provision of such a filter plate made from stainless steel or other non-corrosive metal, useful in the filtration of normally corrosive chemicals and which is specially designed for use with food products, pharmaceutical products and like materials in which great cleanliness is required to avoid fermentation or other forms of decomposition. The invention provides a filter plate ideally adopted to the handling of such products, particularly in eliminating inaccessible pockets or recesses where such materials may collect and escape examination and elimination in ordinary cleaning processes.

In general, filter plates of the invention comprise a grooved drainage field formed of uniformly corrugated sheeting of stainless steel or the like for supporting the filter media and providing drainage grooves for the reception and guidance of the liquid filtrates. The corrugated sheeting is preferably welded securely to a surrounding frame of rigid bar stock, the manner of attachment of the sheeting to said frame being such that the minimum area is required for frame members, thus providing enlarged filtration area. A special welding between critical areas of the corrugated field and the frame members is provided so as to impart special rigidity and strength to the field sheeting in such areas and thereby compensate for the minimized cross-section of the frame members.

It will be understood that the foregoing general description and the following detailed description as well are exemplary and explanatory but are not restrictive of the invention.

Referring now in detail to the present preferred embodiments shown by way of illustration in the accompanying drawings, the form thereof illustrated in Fig. 1 is specially designed for filtration of pharmaceutical products, foods, etc. where special cleanliness is required, as mentioned above. However, the filter plate shown in Fig. 1 also embodies the other principal features of the invention, and, as shown, is a design best adapted for relatively small plates up to, say, twenty-four inches on a side. As shown, the grooved filtration field of said plate comprises a rectangular corrugated sheet 10 of relatively thin stainless steel or the like in which the lands 11 and grooves 12 of the corrugations preferably run vertically, although this is not necessarily required. The frame bordering said field member 10 is primarily formed of straight bars throughout the upper stretch 15, the side members 16 and 17 and the bottom member 18. As shown, said frame bars are rectangular in cross-section and may desirably be formed of hollow stock, thereby combining maximum lightness with great strength. As shown, the corners of the frame forming the plate are composed of square solid blocks 20 to which the ends of the vertical and horizontal frame bars are welded. This connection may be made by other means as by welding mitered ends of the hollow bars 15 and 16, for example.

In the particular form of plate shown in Fig. 1 there is provided a larger, square block 25 at the upper left hand corner to which the ends of the frame members 15 and 17 are welded. The vertical faces of plate 25 are flush with the adjacent surfaces of the frame bars 15 and 17. Said corner block 25 is so enlarged so as to provide room for the boring therethrough of the feed port or eye 26, said port being of conventional construction and adapted to communicate on either side of the plate with corresponding ports formed in frames of the filter-press which are positoned between adjacent plates. In the particular form of plate here shown the port 26 may be provided with a transverse conduit 27 leading to the opposite faces of the field sheet 10 for the passage of washing fluid.

In the diagonally opposite corner of the plate (the lower right hand corner in Fig. 1), a similar block 29 is joined to the lower end of bar 16 and the right hand end of bar 18. An outlet of drainage port 30 is bored perpendicularly through block 29 for drainage communication with corresponding aligned ports in adjacent frames and plates. A drainage conduit 31 is bored transversely through block 29 to communicate with the bottom of port 30, said drainage port being substantially equal in diameter to the overall thickness of the corrugated plate 10 and lying essentially tangent to the upper surface of the bottom frame bar 18.

It will be noted that the widths of the blocks 25 and 29 are substantially greater than the width of the corresponding frame members 17 and 16, thus leaving exposed for additional filtration area two rectangular zones A and B comprising the substantial parts of the corrugated sheet lying respectively below the lower edge of block 25 and above the upper edge of block 29. It will be obvious that similar exposed zones C and D lie along the top and bottom of sheet 10, to the right of block 25 and to the left of block 29, respectively.

It will be appreciated that corrugated plates, like the field plate 10, have substantial rigidity in the vertical direction, but will lack such rigidity transversely to the lands and grooves, that is horizontally as shown in Fig. 1. This is due, of course, to the accordion-like construction of such corrugated plates. The manner of attachment of the field plate 10 to the frame members above described is, in accordance with the invention, designed to impart substantial strength and rigidity to the plate in the horizontal direction and thus compensate not only for the tendency of the plate to give horizontally, but also to provide additional strength in zones A and B adjacent the vertical side bars 16 and 17, where the frame is relatively narrow and the filtration area correspondingly widened.

For these purposes the corrugated plate 10 is welded firmly to the frame members at a plurality of points, and the welding is particularly heavy and closely spaced in zones A and B along the vertical edges of the corrugated plate and at the tops and bottoms thereof adjacent the large ends blocks 25 and 29. Thus, as shown, the right hand edge of plate 10 is welded to the inner face of vertical frame bar 16 at a plurality of closely spaced points 35 throughout the length thereof and the same is true at the points 36 joining the left hand edge of plate 10 and the inner face of bar 17. Along the upper edge 37 of block 29, the corrugated plate is welded very firmly by spots of welding 38 preferably at each point where the edge of the corrugated plate crosses an edge of said upper surface 37. This close spot welding is also carried out at 39 at the upper end of the plate 10, joining it to bar 15. Similarly that portion of the corrugated plate 10 which lies below the lower edge 40 of block 25 is very closely welded at each point of contact 41 and similar close welding is also provided at point 42 along the corresponding bottom edge of the plate 10. In those parts of the plate between zones A and B, i. e. between the inner vertical edges of blocks 25 and 29, welding points 45 at the bottom and 46 at the top may be spaced much more widely, say at every third corrugation.

Because of the special welding construction above-described, a great measure of strength and rigidity is provided for the corrugated plate in the open filtration areas of zones A and B. In effect the close welding of these portions of the corrugated plate, provides a rigidity and strength compensating for the absence of a full width side frame bar corresponding in width to the blocks 25 and 29 on either side of the plate. This extra strength and rigidity are due not only to the closeness of the welding points themselves, but also because the close and rigid fixing of the ends of the corrugated plate in these shortened zones A and B provides a sort of truss or arch-like construction along the welded edges of said zones. Hence, although the exposed or filtering area of the plate is increased by these zones or strips below and above the blocks 25 and 29, respectively, the effect so far as the lateral stretching or weakness of the corrugated plate is concerned is substantially the same as though the side bars were solid and equal in width to the blocks 25 and 29.

Also in accordance with the invention, the special construction of the plate shown in Fig. 1 is designed to provide for maximum cleanliness and ease of inspection in connection with the filtration of pharmaceutical, food and other fermentable products previously referred to. For this purpose the upper and lower edges of the corrugated plate 10 are not directly joined to the flat faces of the bars 15 and 18, respectively, but are spaced therefrom so as to leave clearances for free washing and drainage and complete visibility in said end areas. Thus a relatively narrow spacing member 50 is welded to the upper face of bar 18 and the bottom edge of the corrugated plate 10 rests thereupon and is welded thereto at the points 42 and 45 previously referred to. As shown in Figs. 3 and 5, it will be noted that the thickness of bar 50 is substantially less than the overall cross-section of corrugated plate 10 so that at the bottoms of the grooves 12 there are openings 51 between the edge of the bar and overhanging part of the corrugated plate, whereby filtered liquid will flow freely over both edges of the bar 50. This construction avoids the formation of any dead end pockets or blind spots in the filter area so that particles of material cannot collect and decompose. This construction also permits ready inspection of the drainage area of the plate at the bottom of the grooves on both sides thereof so as to insure complete cleanliness.

It will be noted that filtered liquid delivered from the bottoms of the grooves 12 passes along the upper face of bar 18 and the vertical side walls of bar 50 to escape into drainage port 31, previously described. For the same general purpose, the upper edge of block 29 is cut away on both sides to form the narrowed member 55, thus providing the same drainage cleanliness in that area. The upper edge of plate 10 is joined to the frame member 15 by the inter-position of a similar narrow strip or bar 60 designed and dimensioned to be in all respects like the lower bar 50. This arrangement facilitates washing and cleanliness at the upper part of the plate. Also, in like manner, the bottom edge of block 25 is cut away to provide the narrowed strip 61 there adjacent to the underlying contacting edge of the corrugated plate.

Referring now to the modified plate form shown in Figs. 6 to 12, the construction thereof is in most respects similar to that of Fig. 1. The plate of Fig. 6 is designed and intended for presses having relatively very large cross-section and certain modifications are provided for that reason. As shown this plate comprises a corrugated field, sheet 100 similar to the sheet 10, and rectangularly disposed, external frame members which are preferably channels in cross-section, comprising the top horizontal member 101, side member 102, bottom member 103 and opposite side member 104. The type of plate shown is one designed to have separate feed channels and wash water channels. For this purpose the large rectangular block 110 is welded to the ends of bars 101 and 102, respectively, and is provided with a conventional feed port 111. At the opposite upper corner a similar block 115 is similarly welded to the frame members and is provided with a wash water port 116 from which lead wash conduits 117 and 118 to the drainage field of the plate.

The areas of the drainage field underlying the bottom edges of blocks 115 and 110 (forming filtration zones E and F) are closely welded as in the case of plate of Fig. 1. In zone E each contacting point 120 is welded to block 115 and similar welding is provided at the opposite contact points 121 on the bottom edge. In like manner the bottom edge of block 110 in zone F is welded at 122 to the upper contacting points of plate 100 and equivalent welding is provided at the opposite contact points on the lower bar 103. Also in accordance with the invention the welding at points 123 and 124 along the side edges is closely spaced, while the welding is more widely spaced along the bottom and top edges at 125 and 126, respectively. Another exposed zone G lies between the inner vertical edges of blocks 110 and 115.

In this form of plate it will be noted that the U-shaped channels embrace the adjacent edges of the rectangular corrugated sheet 100. However, the bottom edge of plate 100 is spaced to lie a substantial distance above the bottom of channel 103, although within the upper portion thereof, thereby providing a transverse drainage channel 130 which extends across the bottom of the plate and communicates with the individual drainage spout 131. A petcock or other drainage control (not shown) may be provided for said spout.

When relatively large plates are made in accordance with the invention additional strengthening means for imparting supplementary lateral rigidity may be provided, preferably in the form of one or more straps 140 which cross the plate horizontally at intermediate levels and are welded at their ends to the side bars 102 and 104. Said straps may also be welded to the lands of plate 100 at various intermediate points.

The invention in its broader aspects is not limited to the specific mechanisms shown and described but departures may be made therefrom within the scope of the accompanying claims without departing from the principles of the invention and without sacrificing its chief advantages.

What I claim is:

1. A filter plate for a plate-and-frame filter comprising a corrugated metal sheet forming a drainage field, and a rectangular supporting frame surrounding said sheet, said sheet being joined to the frame at a plurality of spaced points, said joints being more numerous adjacent the corners of the frame so as to join the sheet and the frame in a truss-like structure whereby the strength of the frame is increased.

2. A filter plate according to claim 1 in which the corrugated metal sheet is joined to the supporting frame by welding.

3. A filter plate for a plate-and-frame filter press comprising a corrugated metal sheet forming a drainage field and having longitudinal and transverse sides, all of said corrugations running in the same direction as the longitudinal sides and a rectangular supporting frame surrounding said sheet, said sheet being welded to the frame at a plurality of equally spaced points along the longitudinal sides thereof and along the transverse sides at each of the first few corrugations nearest the longitudinal sides and at greater intervals toward the center of the sides.

4. A filter plate as set forth in claim 3 having stiffening members between the longitudinal sides of the frame said members being positioned transversely with respect to the corrugations and being joined to the corrugations intermediate the sides of the frame.

References Cited in the file of this patent

UNITED STATES PATENTS

| | | |
|---|---|---|
| 1,194,949 | Burchenal | Aug. 15, 1916 |
| 1,282,414 | Hagstrom | Oct. 22, 1918 |
| 2,122,259 | McKenna | June 28, 1938 |
| 2,359,368 | Klopfenstein | Oct. 3, 1944 |
| 2,392,537 | Klopfenstein | Jan. 8, 1946 |
| 2,590,242 | Fusco | Mar. 25, 1952 |
| 2,663,431 | Clarke | Dec. 22, 1953 |

FOREIGN PATENTS

| | | |
|---|---|---|
| 831,613 | France | June 13, 1938 |
| 495,276 | Belgium | May 15, 1950 |
| 655,385 | Great Britain | July 18, 1951 |
| 238,568 | Germany | Sept. 28, 1951 |